(12) United States Patent
Haimer

(10) Patent No.: US 11,926,020 B2
(45) Date of Patent: Mar. 12, 2024

(54) CLAMPING APPARATUS FOR CLAMPING-IN AN OBJECT, APPARATUS HAVING A CLAMPING APPARATUS AND VISE HAVING A CLAMPING APPARATUS

(71) Applicant: FRANZ HAIMER MASCHINENBAU KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 734 days.

(21) Appl. No.: 16/895,096

(22) Filed: Jun. 8, 2020

(65) Prior Publication Data
US 2020/0384612 A1 Dec. 10, 2020

(30) Foreign Application Priority Data
Jun. 6, 2019 (DE) .............................. 102019115398

(51) Int. Cl.
*B25B 1/10* (2006.01)
*B25B 1/00* (2006.01)
(Continued)

(52) U.S. Cl.
CPC ................ *B25B 1/103* (2013.01); *B25B 1/00* (2013.01); *B25B 1/02* (2013.01); *F16B 35/041* (2013.01); *F16B 37/085* (2013.01); *F16B 37/125* (2013.01)

(58) Field of Classification Search
CPC .... F16B 37/085; F16B 37/0807; F16B 2/065; B25B 1/103; B25B 1/125
(Continued)

(56) References Cited

U.S. PATENT DOCUMENTS 246,127 A * 8/1881 Hampshier ............. F16B 39/06
411/327
922,482 A * 5/1909 Jacobs ..................... F16B 39/32
411/941
(Continued)

FOREIGN PATENT DOCUMENTS

DE 3228646 A1 2/1984
DE 3525196 A1 1/1987
(Continued)

*Primary Examiner* — Flemming Saether
(74) *Attorney, Agent, or Firm* — Laurence A. Greenberg; Werner H. Stemer; Ralph E. Locher

(57) ABSTRACT

A clamping apparatus includes a spindle body and a nut element to be screwed together for decreasing a spacing between first and second clamping elements to clamp an object disposed therebetween. The nut element has roller bodies with a defined roller engagement structure axially rotatably secured on a receiving body of the nut element and distributed in circumferential direction. A plurality of engagement regions distributed and/or spaced apart on the spindle body each have one spindle body engagement structure. The roller engagement structures of the roller bodies engage or can engage the spindle body engagement structures of the spindle body. The nut element can be screwed to the spindle body by the mutually engaged engagement structures of the spindle body and of the roller bodies, in particular with rolling of the roller bodies on the spindle body. An apparatus and a vise having the clamping apparatus are also provided.

15 Claims, 7 Drawing Sheets

(51) Int. Cl.
*B25B 1/02* (2006.01)
*F16B 35/04* (2006.01)
*F16B 37/08* (2006.01)
*F16B 37/12* (2006.01)

(58) Field of Classification Search
USPC .................. 411/418, 437, 433, 297, 941.2
See application file for complete search history.

(56) References Cited

U.S. PATENT DOCUMENTS

| | | | | |
|---|---|---|---|---|
| 959,222 | A * | 5/1910 | Jacobs | F16B 39/32 411/297 |
| 2,708,854 | A | 5/1955 | Makholm | |
| 2,730,154 | A * | 1/1956 | Aspey | F16B 39/32 411/948 |
| 2,828,662 | A * | 4/1958 | Antal | F16B 37/085 285/391 |
| 4,341,375 | A * | 7/1982 | Romanin | B25B 1/103 269/95 |
| 4,375,770 | A * | 3/1983 | Druet | F16H 25/2252 74/424.92 |
| 4,781,507 | A * | 11/1988 | Duenas | F16B 37/085 411/432 |
| 5,247,846 | A * | 9/1993 | Grossmann | F16H 25/2025 269/92 |
| 9,546,718 | B2 | 1/2017 | Buvril et al. | |
| 10,584,777 | B2 | 3/2020 | Dubus et al. | |
| 11,267,054 | B2 * | 3/2022 | Haimer | B23B 31/20125 |

FOREIGN PATENT DOCUMENTS

| | | |
|---|---|---|
| DE | 19916288 A1 | 10/2000 |
| DE | 202013105526 U1 | 2/2014 |
| WO | 2017025118 A1 | 2/2017 |

* cited by examiner

CLAMPING APPARATUS FOR CLAMPING-IN AN OBJECT, APPARATUS HAVING A CLAMPING APPARATUS AND VISE HAVING A CLAMPING APPARATUS

CROSS-REFERENCE TO RELATED APPLICATION

This application claims the priority, under 35 U.S.C. § 119, of German Patent Application DE 10 2019 115 398, filed Jun. 6, 2019; the prior application is herewith incorporated by reference in its entirety.

BACKGROUND OF THE INVENTION

Field of the Invention

The invention relates to a clamping apparatus for clamping-in an object, including a spindle body and a nut element which can be screwed to the spindle body for decreasing a spacing between first and second clamping elements of the clamping apparatus by screwing the spindle body and/or the nut element to clamp-in the object disposed between the clamping elements. The invention also relates to an apparatus with the clamping apparatus and to a vise with the clamping apparatus.

It is well known to connect components by screw connections. In that case, a screw is as a rule guided with a threaded section through continuous recesses of the components to be connected, and subsequently a screw nut is brought into threaded engagement with the threaded section of the screw. The screw nut is then screwed onto the screw until the components are clamped-in between the screw nut and a screw head of the screw.

Furthermore, it is also known to use a vise, in order to clamp-in a workpiece to be machined fixedly during its machining. A vise usually has a threaded spindle which is secured in such a way that it can be rotated axially on a first clamping jaw element which has a first clamping jaw, and a nut element which is situated in threaded engagement with the threaded spindle. In that case, the nut element is secured fixedly on a second clamping jaw element of the vise with a second clamping jaw so as to rotate with it. In addition, the first clamping jaw element is usually secured on the second clamping jaw element in such a way that it can be moved in a linear manner, whereas the second clamping jaw element is fixed in a stationary manner. In that case, by way of rotational actuation of the threaded spindle, the first clamping jaw can be moved toward the second clamping jaw, and therefore a workpiece which is situated between the clamping jaws can be clamped-in fixedly.

In order to provide for particularly rapid clamping-in of workpieces of different size, it is additionally known to provide a rapid adjusting mechanism on a vise, through which rapid adjusting mechanism at least one of the clamping jaws can be adjusted or moved more rapidly than is possible in the case of a conventional actuation of the vise.

German Patent Application DE 35 25 196 A1 has disclosed, for example, a vise with a rapid adjustment device, in which vise two threaded blocks are guided in a bearing block and the threaded blocks each has a partial counterthread for engagement into the thread of a spindle. In addition, compression springs which are supported on the threaded blocks and pins for securing the engagement of the partial counterthreads to the thread of the spindle are provided. Each pin has an annular slot and a continuous circumferential face, and is mounted in the bearing block in such a way that it can be displaced. If the latching webs of the threaded blocks act on the continuous circumferential faces of the pins, the threaded blocks are pressed against the spindle, with the result that the threaded blocks with their partial counterthreads are in engagement with the thread of the spindle, and a rotational actuation of the spindle brings about a reduction of the spacing of the clamping jaws. If the latching webs engage into the annular slots of the pins, the threaded blocks are moved away from the spindle by the compression springs, with the result that the threaded blocks with their partial counterthreads are out of engagement with the thread of the spindle, and a rapid adjustment of the spindle or of the clamping jaw which is connected to the spindle becomes possible.

SUMMARY OF THE INVENTION

It is accordingly an object of the invention to provide a clamping apparatus for clamping-in at least one object, an apparatus having a clamping apparatus and a vise having a clamping apparatus, which overcome the hereinafore-mentioned disadvantages of the heretofore-known devices of this general type and with which the object can be clamped-in with a high clamping force in a particularly simple and effective way.

With the foregoing and other objects in view there is provided, in accordance with the invention, a clamping apparatus for clamping-in at least one object, including a spindle body and a nut element which can be screwed to the spindle body, in which it is possible for a spacing between a first and a second clamping element of the clamping apparatus to be decreased by way of screwing actuation of the spindle body and/or the nut element, and for an object which is disposed, in particular, between the clamping elements to therefore be clamped-in by the clamping elements. According to the invention, the nut element has a plurality of (in particular, cylindrical) roller bodies with a defined roller engagement structure, the roller bodies being secured axially rotatably on a (in particular, sleeve-shaped) receiving body of the nut element and being disposed on the nut element in such a way that they are distributed in the circumferential direction.

In addition, on the spindle body, a plurality of engagement regions which are distributed and/or spaced apart from one another, in particular in the circumferential direction, are configured with in each case one spindle body engagement structure, the roller bodies being in engagement or being capable of being brought into engagement by way of their roller engagement structure with the spindle body engagement structures of the spindle body. Furthermore, the nut element can be screwed to the spindle body by the engagement structures, which are in engagement or in threaded engagement with one another, of the spindle body and of the roller bodies, in particular with rolling of the roller bodies on the spindle body.

In this way, an object can be simply and effectively clamped-in with a high clamping force, since it becomes possible by way of the axially rotatably secured roller bodies in conjunction with the engagement regions of the spindle body for the spindle body and the nut element which engages around the spindle body in an annular manner to be moved or displaced relative to one another without a threaded engagement. Thus, for example, in the case of a screw connection of a plurality of components, the nut element can be placed onto the spindle body without a threaded engagement and can be displaced relative to the spindle body until it is situated in the vicinity of the components to be clamped-in. Subsequently, the nut element and the spindle body can then be brought into threaded engagement, and the components can be clamped-in by way of further rotational actuation of the nut element relative to the spindle body. In an analogous manner, for example also in the case of a vise, the spindle body can be brought out of threaded engagement with the nut element and can be moved relative to the nut element until the movable clamping jaw is situated in the vicinity of a workpiece to be clamped-in. As a result, particularly simple and rapid clamping in of at least one object is made possible.

Furthermore, in the case of the construction according to the invention, the nut element is also not in threaded engagement along its entire circumference with the spindle body, but rather merely with the axially rotatably secured roller bodies. Thus, the frictional forces which act in the case of screwing of the nut element to the spindle body are reduced considerably. In this case, merely rolling friction and no sliding friction as in the case of conventional threads has to be overcome. As a result, the screw thread can be constructed in such a way that the clamping force for clamping-in an object is increased effectively in the case of a constant effort for the rotational actuation of the nut element and/or the spindle body.

In one preferred refinement of the clamping apparatus according to the invention, the spindle body engagement structure of each spindle body engagement structure is formed by way of a plurality of circumferential grooves which are spaced apart from one another and by way of which webs which run around the spindle body on the outer side are configured. Through the use of spindle body engagement structures of this type, the nut element can be screwed to the spindle body in a simple and functionally reliable manner. It is preferably provided in this case that the spindle body webs of each engagement region run parallel to one another.

The grooves of each spindle body engagement region preferably form a spindle body thread. Through the use of the spindle body thread, the nut element can be screwed to the spindle body in an effective way through the roller bodies which can be brought into engagement with the spindle body threads. In this case, each spindle body thread extends from a starting region as far as an end region, as viewed in the circumferential direction. In order to provide for a functionally reliable construction, the thread pitch of each spindle body thread can be constant, starting from the starting region toward the end region.

As an alternative, it can also be provided that the thread pitch of each spindle body thread changes, in particular decreases, starting from the starting region toward the end region. The clamping-in of an object can be optimized by way of the changing thread pitch. In particular, a reduction of the thread pitch is advantageous in this case. As a result, in the case of screwing to the spindle body, the nut element can first of all be guided with the roller bodies over a region with a high thread pitch, with the result that a relatively great axial travel is covered over a short screw travel by the nut element. In the thread region, only a relatively small clamping force or no clamping force as yet is exerted for clamping-in an object, with the result that the effort for rotational actuation of the nut element and/or the spindle element is low despite the high thread pitch. Subsequently, the nut element can then be guided with its roller bodies over a region with a considerably decreased thread pitch. In the thread region, the maximum clamping force for clamping-in an object can then be exerted. In this case, furthermore, the nut element can be screwed to the spindle body with a relatively small effort as a result of the low thread pitch.

Each spindle body engagement region is particularly preferably assigned a receiving slot of the spindle body, which receiving slot runs in the axial direction, adjoins the respective spindle body engagement region in the circumferential direction, and the contour of which is adapted, in particular, to the roller bodies, the roller bodies of the nut element being disposed partially in the receiving slots in a defined rotational position of the nut element relative to the spindle body. It is then provided that, in the case of roller bodies which are disposed in the receiving slots, the engagement structures of the spindle body and of the roller bodies are out of engagement, and the nut element can be displaced in the axial direction relative to the spindle body. Through the use of receiving slots of this type, the spindle body and the nut element which engages around the spindle body in an annular manner can be brought out of threaded engagement simply and effectively and can be moved relative to one another.

In one alternative refinement, it can also be provided that each spindle body engagement region is assigned a recess which adjoins the respective spindle body engagement region in the circumferential direction, is, in particular, cylindrical and/or runs in the axial direction. A rotational pin is then secured in each recess in such a way that it can be rotated axially and, in particular, in such a way that its contour is adapted, each rotational pin having a circumferential section with a rotational pin engagement structure which corresponds to the spindle body engagement structures. In addition, in a defined rotational position of the rotational pins relative to the spindle body, the rotational pin engagement structures configure, together with the spindle body engagement structures, an engagement structure which runs completely around the spindle body. An engagement structure which runs completely around the spindle body can thus be realized in an effective way.

It is preferably provided in this case that each rotational pin has a circumferential section with a recess and/or flattened portion, it being possible, in a defined rotational position of the rotational pins, for the nut element to be disposed with part of the roller bodies in the spindle body recesses in such a way that the engagement structures of the spindle body and of the roller bodies are out of engagement, and that the nut element can be displaced in the axial direction relative to the spindle body. The spindle body and the nut element which engages around the spindle body in an annular manner can thus likewise effectively be brought out of threaded engagement and moved relative to one another.

In a further preferred refinement, the plurality of spindle body engagement regions are configured on a first spindle section of the spindle body, the first spindle section being adjoined by a second spindle section of the spindle body, on which second spindle section an engagement structure which runs completely around the spindle body and can be brought into threaded engagement with the roller engagement structure of the roller bodies is configured.

Specifically, the engagement structure of the second spindle region can be formed by way of a thread with at least one circumferential thread groove, at least one web which runs helically around the spindle body on the outer side being configured by way of the thread groove. With a screw thread of this type which is configured, in particular, as a conventional external thread, the clamping nut can be screwed onto the base body in a functionally reliable manner. In addition, an external thread of this type can be manufactured particularly simply.

The roller engagement structure of each roller body is preferably formed by way of a plurality of circumferential grooves which are spaced apart from one another in the roller axial direction and by way of which annular webs which extend around the respective roller body in the circumferential direction are configured. Through the use of a configuration of this type of the roller engagement structures, the nut element can be screwed to the spindle body in a functionally reliable manner.

As an alternative, the roller engagement structure can also itself be configured as a continuous thread, the pitch direction of which corresponds to the pitch direction of the spindle body thread. This configuration brings about a greater axial clamping travel in the case of tightening of the nut element.

Each roller body can expediently have bearing journals which protrude on the end side and by which the respective roller body is secured on the receiving body of the nut element in such a way that it can be rotated axially. The roller bodies can thus be secured on the nut element reliably and in such a way that they can effectively be rotated axially. In this case, the roller bodies can be secured on the receiving body directly or indirectly or through at least one connecting element.

Each roller body is preferably mounted in such a way that it can be rotated axially, in particular by the bearing journals, in an annular, in particular circularly annular, bearing cage of the nut element. With a bearing cage of this type, the roller bodies can be fastened in a simple way to the nut element or to the sleeve-shaped receiving body of the nut element in such a way that they can be rotated axially and at a defined spacing in the circumferential direction from one another. It is preferably provided in this case that the annular bearing cage is of multiple-piece configuration with a plurality of ring segment elements which are, in particular, rectangular in cross section, and at least part or some of the ring segment elements are assigned at least one roller body. The assembly of the bearing cage on the nut element is thus simplified considerably. It is particularly preferred in this case if each ring segment element is assigned a single roller body.

The nut element can expediently have a plurality of, in particular two, bearing cages which are spaced apart from one another in the axial direction and in which in each case a plurality of roller bodies are mounted in such a way that they can be rotated axially. Through the use of the plurality of bearing cages which are spaced apart from one another, undesired "tilting" of the nut element which is situated in threaded engagement with the spindle body is counteracted simply and effectively. In addition, it is also possible by way of a construction of this type for particularly high axial forces to be transmitted between the nut element and the spindle body.

The sleeve-shaped receiving body preferably has at least one receiving body engagement structure, by way of which the receiving body is in engagement with the roller engagement structure of the roller bodies. In this way, an effective transmission of the axial clamping force from the roller bodies to the nut element and effective guidance of the roller bodies in the circumferential direction are realized. The receiving body engagement structure can expediently be formed by way of a plurality of circumferential grooves which are spaced apart from one another and by way of which annular webs which extend around the receiving body in the circumferential direction on the inner side are configured. If the roller bodies have an external thread, it is preferred in contrast that the receiving body engagement structure has an internal thread which corresponds to the roller body external thread.

In one specific refinement, the sleeve-shaped receiving body can have at least one recess or depression which runs in the circumferential direction on the inner side and in which the annular bearing cage is disposed in such a way that its contour is adapted. The bearing cage can thus be connected to the receiving body in a simple and effective way. In this case, the bearing cage which is disposed in the recess is preferably secured on the sleeve-shaped receiving body in such a way that it can be rotated in the circumferential direction relative to the receiving body. A wall region of the sleeve-shaped receiving body, which wall region delimits the recess on the bottom side, can expediently configure the receiving body engagement structure.

In a further embodiment, the spacings of the grooves of the receiving body engagement structure and/or of the roller body engagement structure and/or of the spindle body engagement structure can be adapted in such a way that, under loading of high axial forces and the resulting deformations of the components, homogeneous contact patterns result between engagement structures which are assigned to one another. In particular, the spacing of the grooves in the receiving body engagement structure and/or the spacing of the grooves in the spindle body engagement structure can be selected to be smaller than the spacing of the grooves of the roller body engagement structures.

The spindle body engagement structures can expediently extend over an axial length of the spindle body, which axial length is multiple times greater, in particular five times greater, than the axial length of the roller bodies.

It is provided in one preferred specific refinement that the spindle body has a screw head, the nut element configuring the first clamping element, and the screw head configuring the second clamping element. In this case, the nut element which has, in particular, a drive profile can be moved in the spindle axial direction toward the screw head by way of rotational actuation in a first rotational direction relative to the spindle body by the engagement structures which are situated in engagement with one another, and therefore at least one object can be clamped-in. In addition, the nut element can be moved in the spindle axial direction away from the screw head by way of rotational actuation in a second rotational direction which is opposed to the first rotational direction relative to the spindle body by the engagement structures which are situated in engagement with one another. Through the use of a clamping apparatus of this type, an effective screw connection of a plurality of components as objects to be clamped-in can be realized.

As an alternative, however, it can also be provided that the spindle body is secured on a first clamping jaw element, which is fixed, in particular, in such a way that it can be moved in a linear manner, with a first clamping jaw in such a way that it can be rotated axially, the nut element being secured fixedly on a second clamping jaw element, which, in particular, is fixed in a stationary manner, with a second clamping jaw so as to rotate with it, the first clamping jaw configuring the first clamping element, and the second clamping jaw configuring the second clamping element. The first clamping jaw can be moved toward the second clamping jaw by way of rotational actuation of the spindle body in a first rotational direction relative to the nut element by the engagement structures which are situated in engagement with one another, and therefore an object can be clamped-in. Furthermore, the first clamping jaw can be moved away from the second clamping jaw by way of rotational actuation of the spindle body in a second rotational direction which is opposed to the first rotational direction relative to the nut element by the engagement structures which are situated in engagement with one another. It is thus possible to realize effective clamping-in of a workpiece to be machined as the object to be clamped-in.

With the objects of the invention in view, there is also provided an apparatus including the clamping apparatus according to the invention, a plurality of components which are connected to one another by the clamping apparatus, each component having a continuous recess, through which the spindle body is guided, in particular at a defined gap distance, and the components being clamped-in between the nut element and the screw head of the spindle body. In this way, an effective screw connection of a plurality of components is realized.

With the objects of the invention in view, there is concomitantly provided a vise including the clamping apparatus according to the invention.

The advantages which result by way of the apparatus according to the invention and the vise according to the invention are identical to the above-mentioned advantages of the clamping apparatus according to the invention, with the result that they are not repeated at this point.

The previous description of advantageous refinements of the invention contains numerous features which are reproduced in the individual subclaims combined in part in several ways. Those features can also expediently be considered individually, however, and can be combined to form appropriate further combinations. In particular, those features can be combined in each case individually and in any desired suitable combination with the method according to the invention.

Even if some terms are used in each case in the singular or in combination with a numeral in the description and/or in the patent claims, the scope of the invention for those terms is not to be restricted to the singular or the respective numeral. Furthermore, the words "a" or "one" are not to be understood as numerals, but rather as the indefinite article.

The above-described properties, features and advantages of the invention and the way in which they are achieved will become clearer and more readily comprehensible in conjunction with the following description of the exemplary embodiments of the invention which will be described in greater detail in conjunction with the drawings/figures (identical parts/components and functions have identical reference numerals in the drawings/figures).

The exemplary embodiments serve to describe the invention and do not restrict the invention to combinations of features indicated therein, not even in relation to functional features. Moreover, features of each exemplary embodiment which are suitable to this end can also explicitly be considered in isolation, can be removed from an exemplary embodiment, can be introduced into another exemplary embodiment in order to supplement the latter, and can be combined with any desired one of the claims.

DETAILED DESCRIPTION OF THE INVENTION

Figure 1:
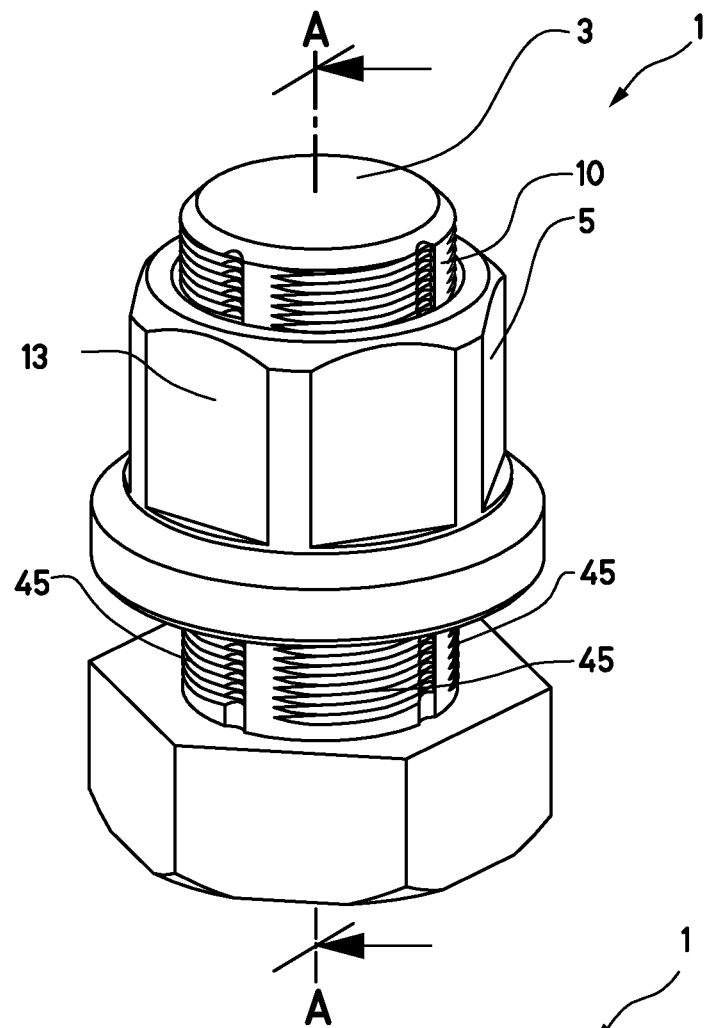
FIG. 1 is a diagrammatic, perspective view of a first exemplary embodiment of a clamping apparatus according to the invention.

Referring now to the figures of the drawings in detail and first, particularly, to FIG. 1 thereof, there is seen a first exemplary embodiment of a clamping apparatus 1 according to the invention. The clamping apparatus 1 has a spindle body 3 and a nut element 5 which can be screwed to the spindle body 3 or can be brought into threaded engagement with the spindle body 3. In this case, the clamping apparatus 1 is configured as a connecting apparatus, through the use of which a plurality of components can be connected by way of a screw connection. In order to clarify a connection of this type, FIG. 2 uses dashed lines to indicate by way of example two components 7, 9 which are connected by the clamping apparatus 1. Each component 7, 9 has a continuous recess or bore through which the spindle body 3 having a substantially cylindrical shank or spindle region 10 is guided. In addition, the components are clamped-in between the nut element 5 and a screw head 57 of the spindle body 3, which screw head 57 is connected to the shank 10.

Figure 2:
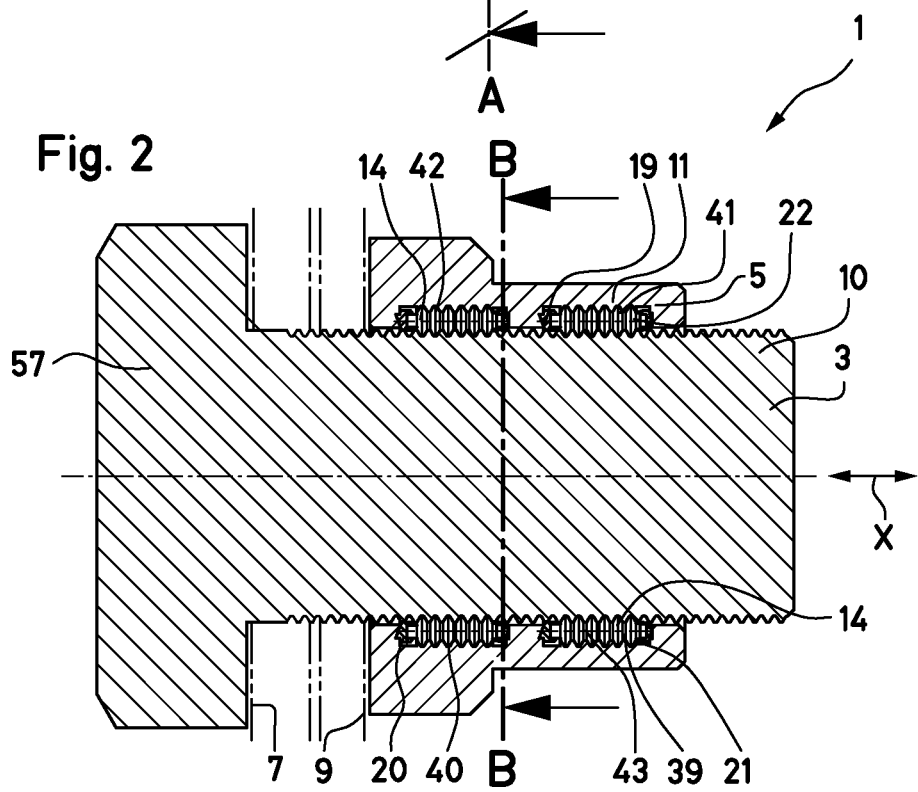
FIG. 2 is a longitudinal-sectional view taken along the sectional plane A-A of FIG. 1, in the direction of the arrows.

As shown, furthermore, in FIG. 2, the nut element 5 has a sleeve-shaped receiving body or base body 11, by way of which the nut element 5 can be pushed or screwed onto the shank 10. In the pushed-on state of the nut element 5, the sleeve-shaped receiving body 11 engages around the shank 10 in an annular manner. The sleeve-shaped receiving body 11 has a drive profile 13 (FIG. 1) for the rotational actuation of the nut element 5. In this case, the drive profile 13 is formed by way of example by way of an external hex.

Figure 3:
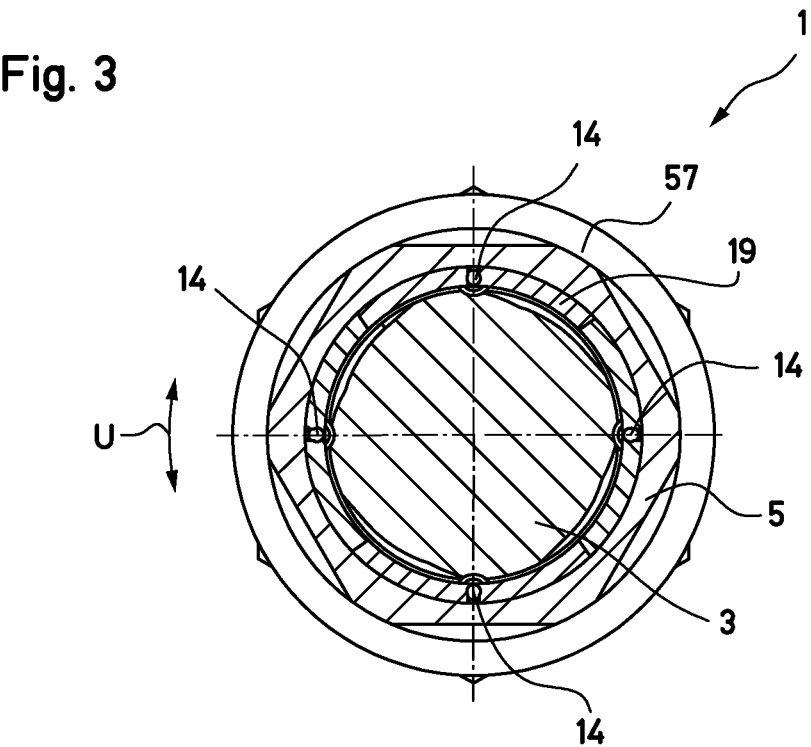
FIG. 3 is a cross-sectional view taken along the sectional plane B-B of FIG. 2, in the direction of the arrows.

According to FIGS. 2 and 3, in addition, the nut element 5 has a plurality of (in this case, by way of example, eight) cylindrical roller bodies 14. In this case, according to FIG. 6, each roller body 14 has cylindrical bearing journals 17 which protrude on the end side or from the end walls 15 and through the use of which the roller bodies 14 are mounted in annular bearing cages 19, 20 of the nut element 5 in such a way that they can be rotated axially. In this case, by way of example, four roller bodies 14 are mounted in each bearing cage 19, 20 in such a way that they can be rotated axially. The roller bodies 14 which are mounted on the respective bearing cage 19, 20 are disposed on the nut element 5 in such a way that they are distributed homogeneously in the circumferential direction U. Each annular bearing cage 19 is disposed in such a way that its contour is adapted in a recess 21, 22 (FIG. 2) of the sleeve-shaped receiving body 11, which recess 21, 22 runs in the circumferential direction U on the inner side. In this case, each bearing cage 19, 20 is secured in the respective recess 21, 22 by way of elongate undercut webs 23 which protrude laterally to the outside, in such a way that the respective bearing cage 19, 20 can be rotated relative to the sleeve-shaped receiving body 11 in the circumferential direction U. In this case, in addition, the bearing cages 19, 20 are spaced apart from one another at a defined axial spacing.

Figure 5:
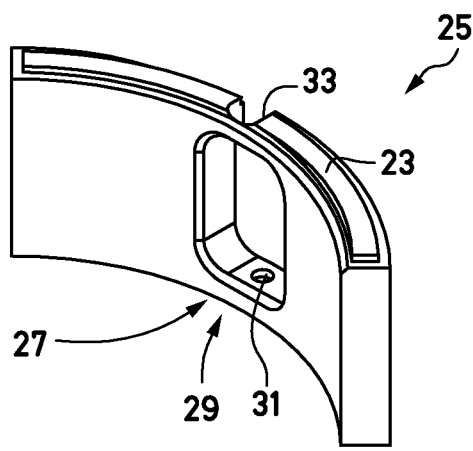
FIG. 5 is a perspective view of a ring segment element of the clamping apparatus.

In this case, furthermore, each annular bearing cage 19, 20 is of multiple-piece configuration with a plurality of (in this case, by way of example, four) ring segment elements 25 of rectangular cross section (FIG. 5). In this case, by way of example, each ring segment element 25 is assigned a single roller body 14. In this case, each roller body 14 is disposed in such a way that its contour is adapted in a continuous recess 27 on the middle (as viewed in the circumferential direction U) region 29 of the respective ring segment element 25. In addition, each ring segment element 25 has journal trunnions 31, 33 on the middle region 29, in which bearing trunnions 31, 33 the bearing journals 17 of the roller bodies 14 are received. In this case, the journal trunnion 31 of the respective ring segment element 25 is formed by way of a closed bore, whereas the journal trunnion 33 of the respective ring segment element 25 is formed by way of a slot which is open toward the outside. In this case, during the assembly of the nut element 5, the roller bodies 14 are first of all guided with one of the bearing journals 17 into the bore 31 and subsequently are guided with the other one of the bearing journals 17 into the slot 33. In this case, furthermore, the undercut webs 23 which protrude laterally to the outside are also configured on each ring segment element 25.

Figure 6:
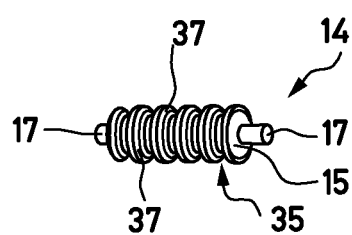
FIG. 6 is a perspective view of a roller body of the clamping apparatus.

According to FIG. 6, in addition, each roller body 14 has a defined roller engagement structure 35. In this case, the roller engagement structure 35 of each roller body 14 is formed by way of a plurality of grooves which are spaced apart from one another in the roller axial direction and by way of which annular webs 37 which extend around the respective roller body 14 in the circumferential direction are configured. In this case, in addition, the longitudinal axis of the roller bodies 14 is disposed parallel to the longitudinal axis of the nut element 5. As an alternative, however, the longitudinal axis of the roller bodies 14 might also be oriented at a defined setting angle with respect to the longitudinal axis of the nut element 5.

The roller bodies 14 are in engagement by way of their roller engagement structure 35 with receiving body engagement structures 39, 40 (FIG. 2) of the receiving body 11, which receiving body engagement structures 39, 40 are configured on wall regions 41, 42 of the receiving body 11 which delimit the circumferential recesses 21, 22 on the bottom side. Each receiving body engagement structure 39, 40 of the receiving body 11 is formed by way of a plurality of grooves which are spaced apart from one another in the axial direction x and by way of which annular webs 43 which extend around the receiving body 11 in the circumferential direction U are configured. In this case, the receiving body engagement structures 39, 40 form a guide for the roller bodies 14 in the circumferential direction U.

Figure 4:
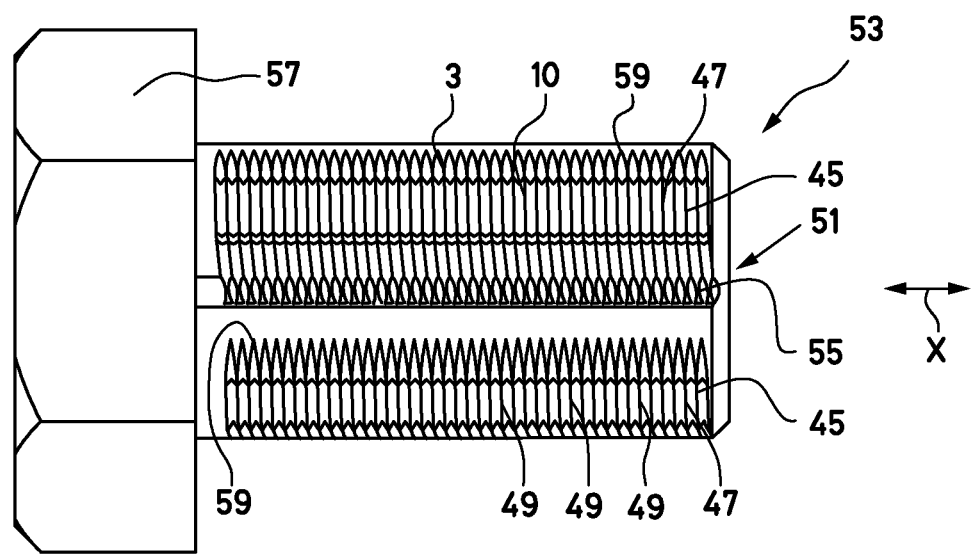
FIG. 4 is a top-plan view of a spindle body of the clamping apparatus.

Furthermore, the shank 10 of the spindle body 3 has a plurality of (in this case, by way of example, four) engagement regions 45 (FIGS. 1, 4) which are distributed homogeneously in the circumferential direction U and are spaced apart from one another, with in each case one spindle body engagement structure 47 which corresponds to the roller engagement structure 35. Through the use of the roller engagement structures 35 of the roller bodies 14 and the spindle body engagement structures 47 of the spindle body 3, the nut element 5 can be screwed to the spindle body 3 or can be brought into threaded engagement with the latter. In the screwed state of the spindle body 3 and the nut element 5, each roller body 14 is in engagement by way of its roller engagement structure 35 with the spindle body engagement structure 47 of an engagement region 45.

In this case, the spindle body engagement structure 47 of each engagement region 45 is formed by way of a plurality of circumferential grooves which are spaced apart from one another and by way of which webs 49 which run around the spindle body 3 on the outer side are configured. In this case, the spindle body webs 49 of each engagement region 45 run parallel to one another. In addition, the grooves of each spindle body engagement region 45 configure a spindle body thread. In this case, as viewed in the circumferential direction U, each spindle body thread 47 extends from a starting region 51 as far as an end region 53, the thread pitch of each spindle body thread 45 being constant starting from the starting region 51 toward the end region 53. As an alternative, however, it might also be provided that the thread pitch of each spindle body thread 45 changes, in particular decreases, starting from the starting region 51 toward the end region 53. In this case, in addition, the spindle body engagement structures 47 extend over an axial length of the spindle body 3, which axial length is multiple times greater than the axial length of the roller bodies 14.

In this case, furthermore, each spindle body engagement region 45 is assigned a receiving slot 55 of the spindle body 3, which receiving slot 55 runs in the axial direction x, adjoins the respective spindle body engagement region 45 in the circumferential direction U, and the contour of which is adapted by way of example in this case to the roller bodies 14. Through the use of the receiving slots 55, the nut element 5 can be placed onto the screw section 44 and can be removed from the screw section 44. In order to place the nut element 5 onto the screw section 44, a roller body 14 is introduced into each receiving slot 55 partially or with a region which protrudes from the receiving body 11 to the inside. The roller bodies 14 which are introduced into the receiving slots 55 are not in engagement by way of their engagement structures 35 with the engagement structures 47 of the screw section 44, with the result that the nut element 5 can be moved relative to the spindle body 3 in the axial direction x. In this case, the receiving slots 55 extend in the axial direction x over the entire axial length of the spindle body engagement structures 47.

In order to screw the nut element 5 to the spindle body 3, the nut element 5 which is placed onto the screw section 44 is actuated rotationally in a first rotational direction relative to the spindle body 3. In this case, starting from the respective receiving slot 55, the roller bodies 14 are introduced into the spindle body engagement region 45 or starting region 51 of the spindle body engagement structure 47 which adjoins the respective receiving slot 55 in the circumferential direction U. In the case of a further rotational actuation of the nut element 5, the nut element 5 is moved in the spindle axial direction x toward the screw head 57 of the spindle body by the engagement structures 35, 47 which are situated in engagement with one another. In this way, components which are disposed between the screw head 57 and the nut element 5 can be clamped-in and therefore connected.

In order to release the screw connection of the nut element 5 and the spindle body 3, the nut element 5 is rotationally actuated in a second rotational direction which is opposed to the first rotational direction. In this case, the nut element 5 is moved in the spindle axial direction x away from the screw head 57 of the spindle body by the engagement structures 35, 47 which are situated in engagement with one another. In addition, starting from the respective spindle body engagement region 45, the roller bodies 14 are introduced into the adjoining receiving slots 55. In a defined rotational position of the nut element 5, the roller bodies 14 are then disposed in the receiving slots 55, with the result that the engagement structures 47, 35 of the spindle body 3 and of the roller bodies 14 are out of engagement, and the nut element 5 can be displaced in the axial direction relative to the spindle body 3. In that rotational position of the nut element 5, the nut element 5 can also be removed from the spindle body 3.

In this case, furthermore, the spindle body 3 also has end stops 59 (FIG. 4), with which the nut element 5 comes into contact in the case of a screw connection to the spindle body 3. In this case, the end stops 59 are formed by way of example by way of the wall regions of the spindle body 3 which delimit the spindle body engagement structures 47 in the circumferential direction U. In the case of a rotational actuation of the nut element 5 in the first rotational direction, the roller bodies 14 come into contact with the wall regions which are disposed on the end regions 53 of the engagement structures 47.

On an end side which faces the screw head 57, the nut element 5 can optionally also have an axial bearing, for example an axial cylindrical roller bearing, by way of which the nut element 5 comes into contact with a component in the case of clamping-in of components. In this way, the frictional forces which act between the component and the nut element 5 in the case of screwing-on of the nut element 5 can be reduced effectively.

Figure 7:
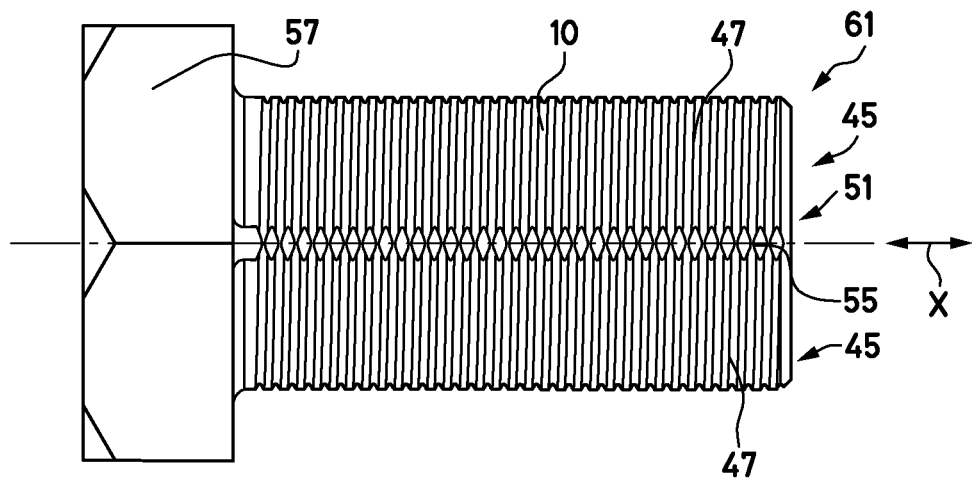
FIG. 7 is a top-plan view in accordance with FIG. 4 of a second exemplary embodiment of a clamping apparatus according to the invention.
Figure 8:
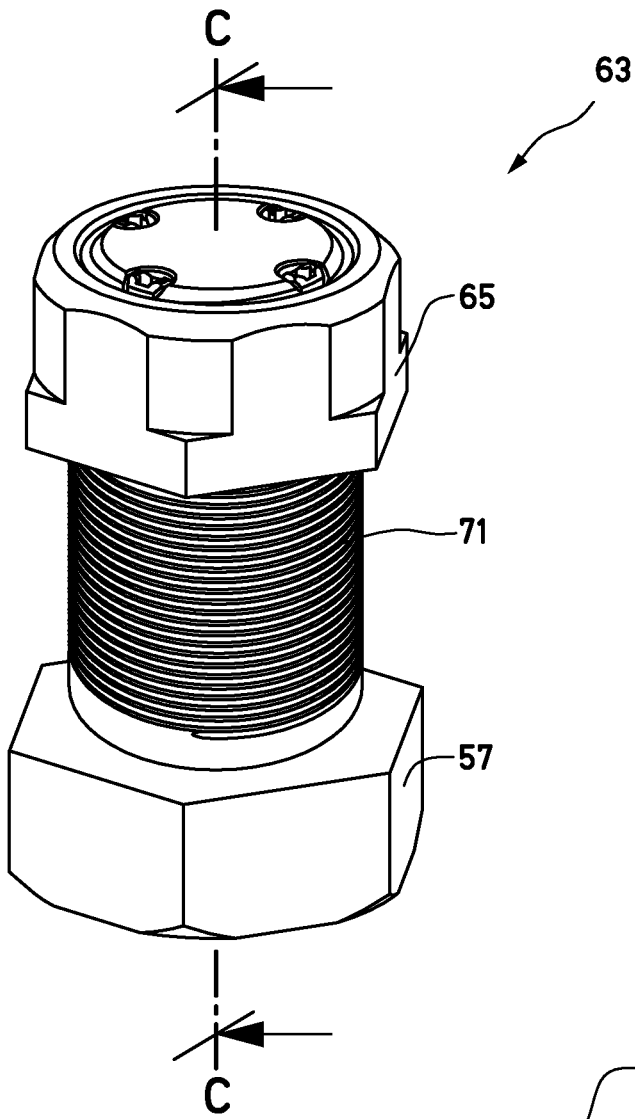
FIG. 8 is a perspective view in accordance with FIG. 1 of a third exemplary embodiment of a clamping apparatus according to the invention.
Figure 9:
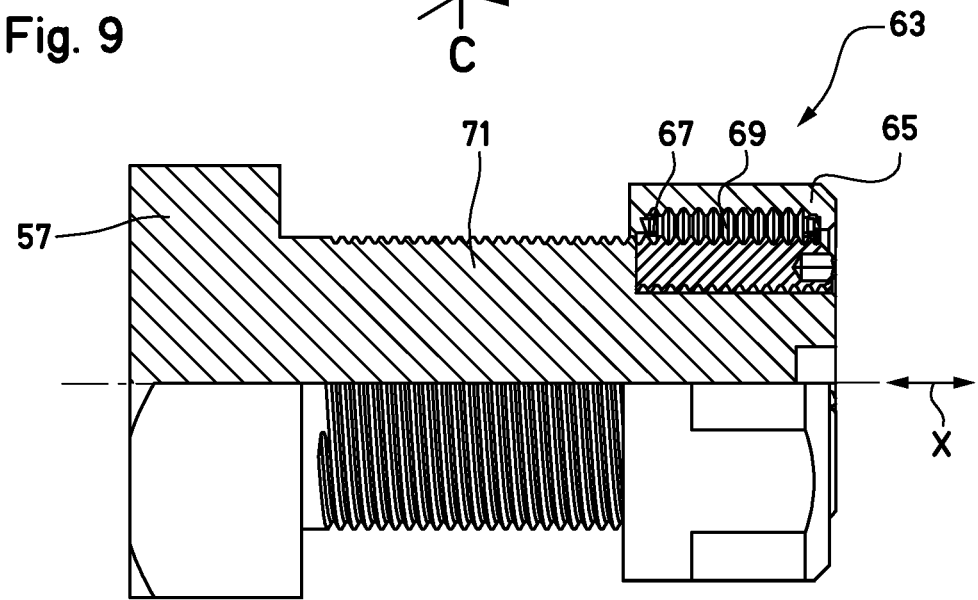
FIG. 9 is a longitudinal-sectional view taken along the sectional plane C-C of FIG. 8, in the direction of the arrows.

FIG. 7 shows a second exemplary embodiment of a clamping apparatus according to the invention. This clamping apparatus has a spindle body 61. In comparison with the spindle body 3, the spindle body 61 does not have any end stops 59. In this case, instead, each spindle body engagement structure 47 adjoins, by way of its end region 53, the receiving slot 55 which follows in the circumferential direction U. In this case, therefore, the roller bodies 14 can also be introduced into the receiving slot 55 which follows in the circumferential direction U in the case of a rotational actuation of the nut element 5 in the first rotational direction, starting from the respective spindle body engagement structure 47.

FIGS. 8 to 13 show a third exemplary embodiment of a clamping apparatus 63 according to the invention. This clamping apparatus 63 has a nut element 65. In comparison with the nut element 5 of the clamping apparatus 1, the nut element 65 has a smaller axial length. In addition, the nut element 65 does not have two bearing cages, but rather a single bearing cage 67, in which a plurality of (in this case, by way of example, four) roller bodies 69 are mounted in such a way that they can be rotated axially. In addition, the roller bodies 69 have a greater axial length than the roller bodies 14.

Furthermore, the clamping apparatus 63 also has a spindle body 71. According to FIG. 10, a substantially cylindrical shank 73 of the spindle body 71 has a first spindle section 75, on which the plurality of spindle body engagement regions 45 are configured. In this case, the first spindle section 75 configures a free end of the shank 73. In this case, in addition, the spindle body engagement regions 45 have a considerably smaller axial length than in the case of the clamping apparatus 1.

Furthermore, the shank 73 of the spindle body 71 also has a second spindle section 77 which adjoins the first spindle section 75 and on which an engagement structure 79 which can be brought into engagement with the roller engagement structure 35 of the roller bodies 14 and runs completely around the spindle body 71 on the outer side is configured. The spindle section 77 is disposed in the axial direction x between the first spindle section 75 and the screw head 57 of the spindle body 71. In this case, in addition, the engagement structure 79 of the second spindle section 77 is formed by way of a thread with a circumferential thread groove, a web 81 which runs helically around the spindle body 71 on the outer side being configured by way of the thread groove.

Figure 10:
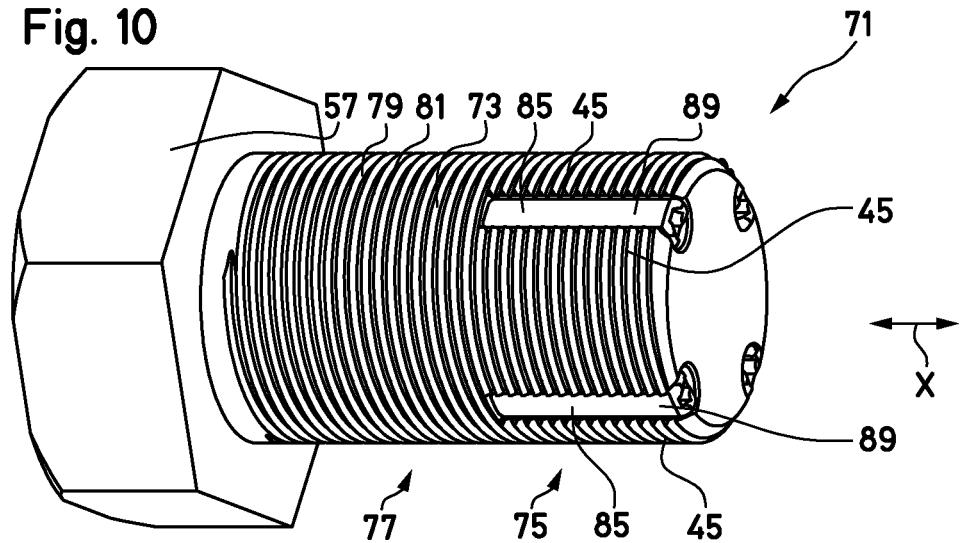
FIG. 10 is a perspective view of a spindle body of the clamping apparatus.
Figure 11:
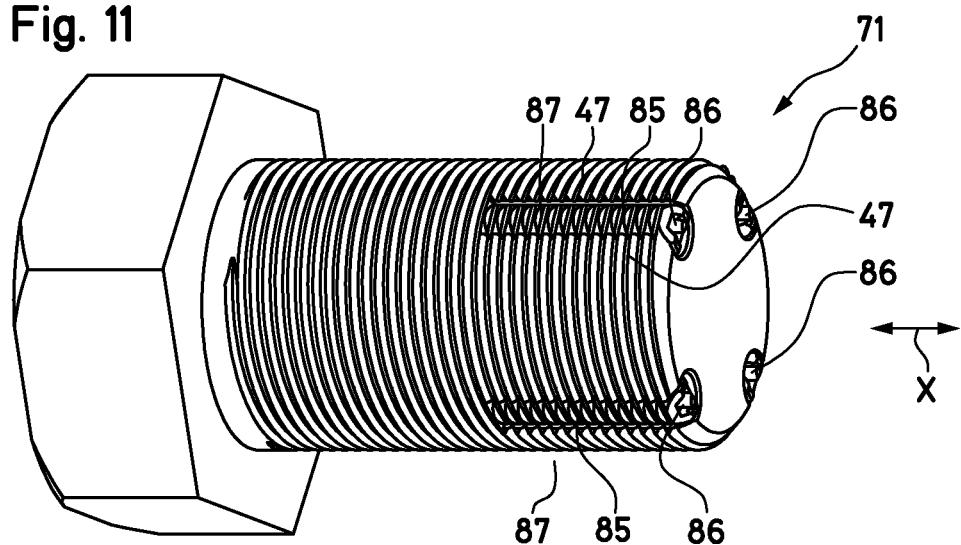
FIG. 11 is a perspective view of the spindle body.
Figure 12:
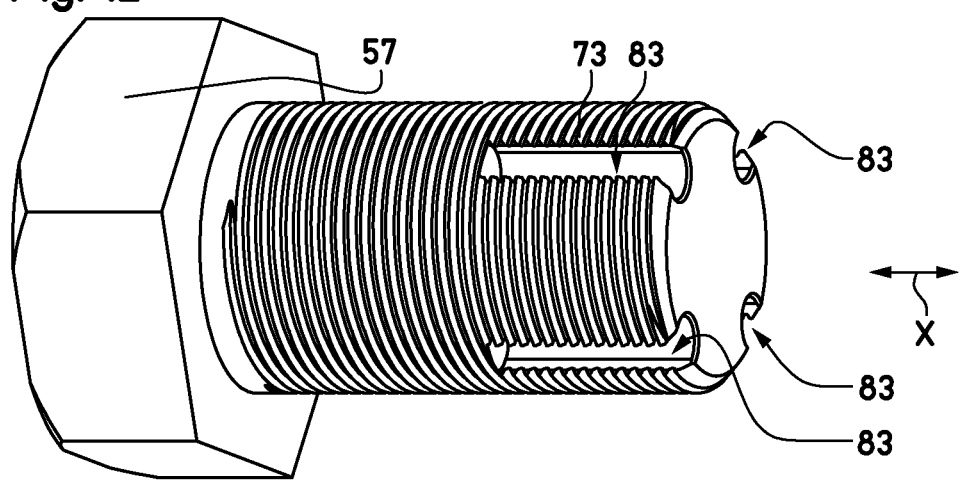
FIG. 12 is a perspective view of part of the spindle body.
Figure 13:
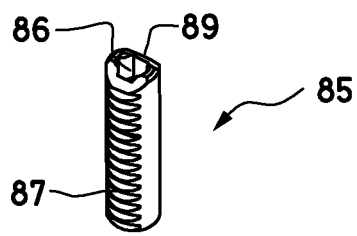
FIG. 13 is a perspective view of a rotational pin of the spindle body.

According to FIGS. 10 to 12, in addition, the spindle body 71 does not have any receiving slots 55. Instead, each spindle body engagement region 45 of the spindle body 71 is assigned a cylindrical recess 83 which adjoins the respective spindle body engagement region 45 in the circumferential direction U. In this case, the cylindrical recesses 83 run in the axial direction x. A substantially cylindrical rotational pin 85 is secured in each recess 83 in such a way that it can be rotated axially, each rotational pin 85 being engaged around by the material of the shank 73 over more than half of its circumference. In this case, on the end side, each rotational pin 85 additionally has a drive profile 86 for the rotational actuation of the rotational pin 85. In this case, by way of example, the drive profile is formed by way of a hexagon socket.

Each rotational pin 85 has a circumferential section 87 (FIG. 13) with a rotational pin engagement structure which corresponds to the spindle body engagement structures 47. In that rotational position of the rotational pins 85 relative to the shank 73 which is shown in FIG. 11, the circumferential section 87 is exposed toward the outside. In this case, together with the spindle body engagement structures 47, the rotational pin engagement structures 87 configure an engagement structure in the form of a multiple start thread, which engagement structure runs around the spindle body 71 completely or only with small interruptions on the outer side.

According to FIG. 10, in addition, each rotational pin 85 has a circumferential section 89 with a flattened portion. In a rotational position of the rotational pins 85 which is shown in FIG. 10, the circumferential section 89 is exposed toward the outside. In that rotational position of the rotational pins 85, the nut element 65 can be disposed in a defined rotational position, in which the roller bodies 69 are disposed partially in the spindle body recesses 83. In this case, the engagement structures 35, 47 of the spindle body 71 and of the roller bodies 69 are then out of engagement. In this case, in addition, the roller bodies 69 then also do not engage by way of their engagement structures 35 into the rotational pins 85. In this case, therefore, the nut element 65 can be displaced relative to the spindle body 71 in the axial direction x, in particular can also be removed from the spindle body 71 and can be placed onto the spindle body 71. As an alternative to the flattened portion 89, the respective rotational pin 85 can also have a (in particular, cylindrical) recess.

Figure 14:
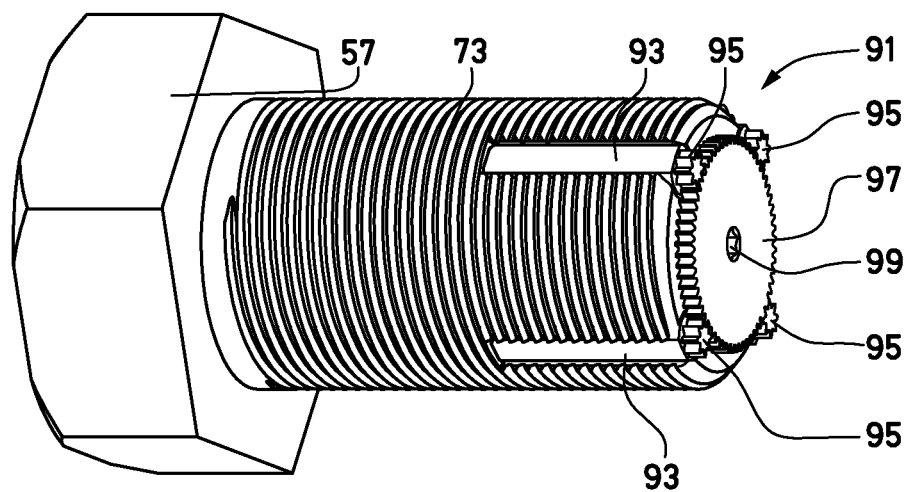
FIG. 14 is a perspective view of a spindle body of a fourth exemplary embodiment of a clamping apparatus according to the invention.
Figure 15:
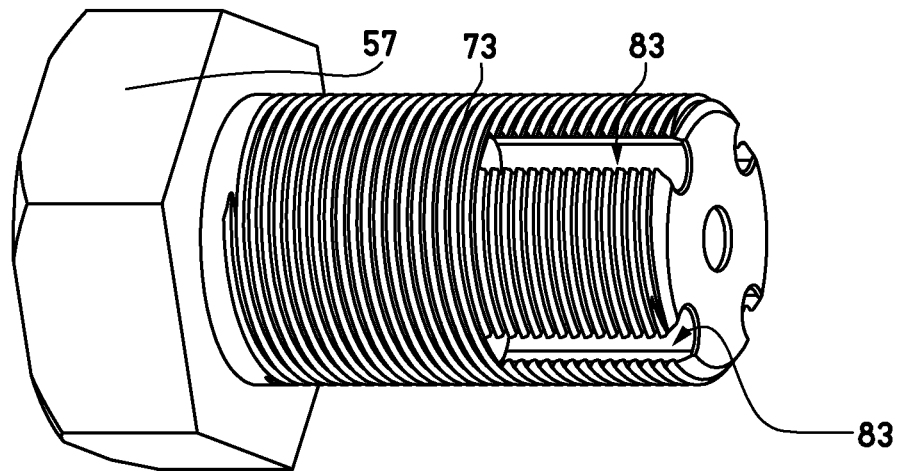
FIG. 15 is a perspective view of a shank of the spindle body.

FIGS. 14 and 15 show a fourth exemplary embodiment of a clamping apparatus according to the invention. This clamping apparatus has a spindle body 91. In comparison with the spindle body 71, the spindle body 91 has rotational pins 93. Each rotational pin 93 has a spur gear 95 at a free end for a rotational drive. The spur gears 95 are in tooth engagement with a centrally disposed spur gear 97 of the spindle body 71, which spur gear 97 is secured on the shank 73 in such a way that it can be rotated axially. The spur gear 97 has a drive profile 99 on a central region for a rotational drive. In this case, by way of example, the drive profile 99 is likewise formed by way of a hexagon socket.

Figure 16:
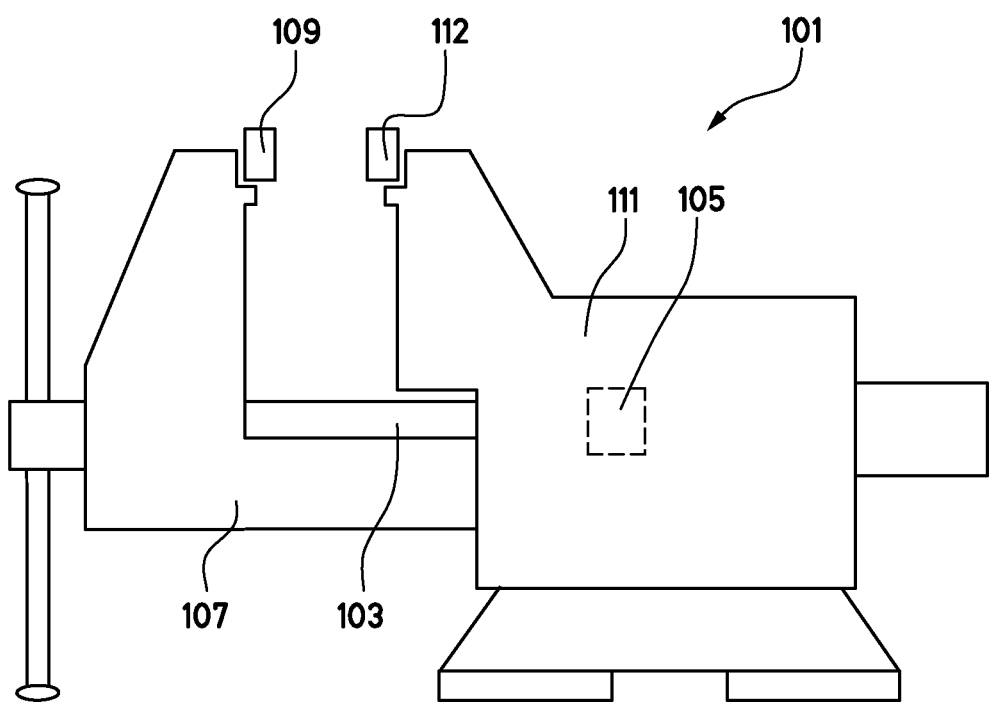
FIG. 16 is a side-elevational view of a third exemplary embodiment of a clamping apparatus according to the invention.

FIG. 16 shows a vise 101 with a fifth exemplary embodiment of a clamping apparatus according to the invention. The vise 101 has a spindle body 103 and a nut element 105 which can be screwed to the spindle body 103 and is indicated using dashed lines. The fundamental construction of the spindle body 103 corresponds to the construction of the spindle body 3, the spindle body 103 not having a screw head, however, in particular. The fundamental construction of the nut element 105 likewise corresponds to the construction of the nut element 5.

In this case, the spindle body 103 is secured on a first clamping jaw element 107 of the vise 101 with a first clamping jaw 109 in such a way that it can be rotated axially. In addition, the nut element 105 is secured fixedly on a second clamping jaw element 111 of the vise 101 with a second clamping jaw 112 so as to rotate with it.

In this case, the first clamping jaw 109 can be moved toward the second clamping jaw 112 by way of rotational actuation of the spindle body 103 in a first rotational direction relative to the nut element 105 by the engagement structures of the spindle body 103 and of the roller bodies of the nut element 105 which are situated in engagement with one another. In this way, a workpiece which is disposed between the clamping jaws 109, 112 can be clamped-in.

By way of rotational actuation of the spindle body 103 in a second rotational direction opposed to the first rotational direction relative to the nut element 105, the first clamping jaw 109 is movable away from the second clamping jaw 112 by the engagement structures of the spindle body 103 and the roller bodies of the nut element 105 situated in engagement with one another.

LIST OF REFERENCE NUMERALS

| | |
|---|---|
| 1 | Clamping apparatus |
| 3 | Spindle body |
| 5 | Nut element |
| 7 | Component |
| 9 | Component |
| 10 | Shank |
| 11 | Receiving body |
| 13 | Drive profile |
| 14 | Roller body |
| 15 | End wall |
| 17 | Bearing journal |
| 19 | Bearing cage |
| 20 | Bearing cage |
| 21 | Recess |
| 22 | Recess |
| 23 | Undercut web |
| 25 | Ring segment element |
| 27 | Recess |
| 29 | Middle region |
| 31 | Journal trunnion |
| 33 | Journal trunnion |
| 35 | Roller engagement structure |
| 37 | Web |
| 39 | Receiving body |
| 41 | Wall region |
| 42 | Wall region |
| 43 | Web |
| 45 | Engagement region |
| 47 | Spindle body engagement structure |
| 49 | Web |
| 51 | Starting region |
| 53 | End region |
| 55 | Receiving slot |
| 57 | Screw head |
| 59 | End stop |
| 61 | Spindle body |
| 63 | Clamping apparatus |
| 65 | Nut element |
| 67 | Bearing cage |
| 69 | Roller body |
| 71 | Spindle body |
| 73 | Shank |
| 75 | Spindle section |
| 77 | Spindle section |
| 79 | Engagement structure |
| 81 | Web |
| 83 | Recess |
| 85 | Rotational pin |
| 86 | Drive profile |
| 87 | Circumferential section |
| 89 | Circumferential section |
| 91 | Spindle body |
| 93 | Rotational pin |
| 95 | Spur gear |
| 97 | Spur gear |
| 99 | Drive profile |
| 101 | Vise |
| 103 | Spindle body |
| 105 | Nut element |
| 107 | Clamping jaw element |
| 109 | Clamping jaw |
| 111 | Clamping jaw element |
| 112 | Clamping jaw |

The invention claimed is:

1. A clamping apparatus for clamping-in an object, the clamping apparatus comprising:
   first and second clamping elements defining a spacing therebetween;
   a spindle body and a nut element to be screwed together by screwing actuation of at least one of said spindle body or said nut element to decrease said spacing for clamping-in an object disposed between said clamping elements;
   said nut element having a receiving body and a plurality of roller bodies with a defined roller engagement structure, said roller bodies being axially rotatably secured on said receiving body and distributed on said nut element in a circumferential direction;
   a plurality of engagement regions at least one of distributed or spaced apart from one another on said spindle body, each of said engagement regions having one respective spindle body engagement structure, said spindle body engagement structures of said spindle body being engaged by or configured to be engaged by said roller engagement structures of said roller bodies;
   said nut element configured to be screwed to said spindle body by engagement of said engagement structures of said spindle body and of said roller bodies with one another;
   each spindle body engagement region being assigned a receiving slot running in an axial direction, adjoining a respective spindle body engagement region in the circumferential direction, and having a contour adapted to said roller bodies;

said roller bodies of said nut element being disposed with a part region in said receiving slots in a defined rotational position of said nut element relative to said spindle body; and upon said roller bodies being disposed in said receiving slots, said engagement structures of said spindle body and of said roller bodies being out of engagement, and said nut element being displaceable in the axial direction relative to said spindle body.

2. The clamping apparatus according to claim 1, wherein:
said receiving body of said nut element is sleeve-shaped, and said roller bodies of said nut element are cylindrical;
said engagement regions are at least one of distributed or spaced apart from one another in the circumferential direction on said spindle body; and
said engagement structures of said spindle body and of said the roller bodies are engaged with one another by rolling of said roller bodies on said spindle body.

3. The clamping apparatus according to claim 1, wherein said spindle body engagement structure of each spindle body engagement region is formed by a plurality of mutually spaced apart circumferential grooves forming webs running around an outer side of said spindle body, and said spindle body webs of each engagement region run parallel to one another.

4. The clamping apparatus according to claim 3, wherein said grooves of each spindle body engagement region form a spindle body thread, each spindle body thread extends from a starting region as far as an end region in the circumferential direction, and a thread pitch of each spindle body thread is constant, starting from said starting region toward said end region.

5. The clamping apparatus according to claim 1, wherein said roller engagement structure of each roller body is formed by a plurality of circumferential grooves being mutually spaced apart in a roller axial direction and forming annular webs extending around a respective roller body in the circumferential direction.

6. The clamping apparatus according to claim 1, wherein said sleeve-shaped receiving body has at least one receiving body engagement structure placing said receiving body in engagement with said roller engagement structure of said roller bodies.

7. The clamping apparatus according to claim 6, wherein said receiving body engagement structure is formed by a plurality of mutually spaced apart circumferential grooves forming annular webs extending around an inner side of said receiving body in the circumferential direction.

8. The clamping apparatus according to claim 1, wherein said spindle body engagement structures extend over an axial length of said spindle body being multiple times greater an axial length of said roller bodies.

9. The clamping apparatus according to claim 1, wherein:
said spindle body has a screw head, said nut element forms said first clamping element, and said screw head forms said second clamping element;
said nut element has a drive profile being movable in an axial direction toward said screw head by rotational actuation in a first rotational direction relative to said spindle body by said mutual engaged engagement structures for clamping-in the object; and
said nut element is movable in the axial direction away from said screw head by rotational actuation in a second rotational direction opposed to the first rotational direction relative to said spindle body by said mutually engaged engagement structures.

10. An apparatus, comprising:
a clamping apparatus according to claim 9; and
a plurality of components to be connected to one another by said clamping apparatus;
each of said components having a continuous recess through which said spindle body is guided; and
said components being clamped-in between said nut element and said screw head of said spindle body.

11. A clamping apparatus for clamping-in an object, the clamping apparatus comprising:
first and second clamping elements defining a spacing therebetween;
a spindle body and a nut element to be screwed together by screwing actuation of at least one of said spindle body or said nut element to decrease said spacing for clamping-in an object disposed between said clamping elements;
said nut element having a receiving body and a plurality of roller bodies with a defined roller engagement structure, said roller bodies being axially rotatably secured on said receiving body and distributed on said nut element in a circumferential direction;
a plurality of engagement regions at least one of distributed or spaced apart from one another on said spindle body, each of said engagement regions having one respective spindle body engagement structure, said spindle body engagement structures of said spindle body being engaged by or configured to be engaged by said roller engagement structures of said roller bodies;
said nut element configured to be screwed to said spindle body by engagement of said engagement structures of said spindle body and of said roller bodies with one another;
each roller body having bearing journals protruding on an end side and axially rotatably securing a respective roller body on said receiving body of said nut element, and each roller body being axially rotatably mounted by said bearing journals in an annular or circularly annular bearing cage of said nut element;
said annular bearing cage having a multiple-piece configuration with a plurality of ring segment elements having rectangular cross sections, and at least part of said ring segment elements being associated with at least one roller body.

12. A clamping apparatus for clamping-in an object, the clamping apparatus comprising:
first and second clamping elements defining a spacing therebetween;
a spindle body and a nut element to be screwed together by screwing actuation of at least one of said spindle body or said nut element to decrease said spacing for clamping-in an object disposed between said clamping elements;
said nut element having a receiving body and a plurality of roller bodies with a defined roller engagement structure, said roller bodies being axially rotatably secured on said receiving body and distributed on said nut element in a circumferential direction;
a plurality of engagement regions at least one of distributed or spaced apart from one another on said spindle body, each of said engagement regions having one respective spindle body engagement structure, said spindle body engagement structures of said spindle body being engaged by or configured to be engaged by said roller engagement structures of said roller bodies;

said nut element configured to be screwed to said spindle body by engagement of said engagement structures of said spindle body and of said roller bodies with one another;

each roller body having bearing journals protruding on an end side and axially rotatably securing a respective roller body on said receiving body of said nut element, and each roller body being axially rotatably mounted by said bearing journals in an annular or circularly annular bearing cage of said nut element;

said nut element having a plurality of said bearing cages being spaced apart from one another in an axial direction, and a plurality of roller bodies ape being axially rotatably mounted in each respective bearing cage.

13. The clamping apparatus according to claim 12, wherein said sleeve-shaped receiving body has at least one recess running in the circumferential direction on an inner side, receiving said at least one annular bearing cage and adapting its contour, and a wall region of said sleeve-shaped receiving body delimits a bottom side of said recess and forms said receiving body engagement structure.

14. A clamping apparatus for clamping-in an object, the clamping apparatus comprising:

first and second clamping elements defining a spacing therebetween;

a spindle body and a nut element to be screwed together by screwing actuation of at least one of said spindle body or said nut element to decrease said spacing for clamping-in an object disposed between said clamping elements;

said nut element having a receiving body and a plurality of roller bodies with a defined roller engagement structure, said roller bodies being axially rotatably secured on said receiving body and distributed on said nut element in a circumferential direction;

a plurality of engagement regions at least one of distributed or spaced apart from one another on said spindle body, each of said engagement regions having one respective spindle body engagement structure, said spindle body engagement structures of said spindle body being engaged by or configured to be engaged by said roller engagement structures of said roller bodies;

said nut element configured to be screwed to said spindle body by engagement of said engagement structures of said spindle body and of said roller bodies with one another;

said spindle body is being axially rotatably secured on a first clamping jaw element with a first clamping jaw, said nut element being co-rotationally fixedly secured on a second clamping jaw element with a second clamping jaw, said first clamping jaw forming said first clamping element, and said second clamping jaw forming said second clamping element;

said first clamping jaw is being movable toward said second clamping jaw by rotational actuation of said spindle body in a first rotational direction relative to said nut element by said mutually engaged engagement structures for clamping-in the object; and said first clamping jaw being movable away from said second clamping jaw by rotational actuation of said spindle body in a second rotational direction opposed to the first rotational direction relative to said nut element by said mutually engaged engagement structures.

15. A vise, comprising a clamping apparatus according to claim 14.

* * * * *